United States Patent
Paulraj et al.

(10) Patent No.: US 11,652,806 B2
(45) Date of Patent: *May 16, 2023

(54) DEVICE LOCKING KEY MANAGEMENT SYSTEM

(71) Applicant: Dell Products L.P., Round Rock, TX (US)

(72) Inventors: Deepaganesh Paulraj, Bangalore (IN); Rama Rao Bisa, Bangalore (IN); Chitrak Gupta, Bangalore (IN); Sushma Basavarajaiah, Bangalore (IN); Mukund P. Khatri, Austin, TX (US)

(73) Assignee: Dell Products L.P., Round Rock, TX (US)

( * ) Notice: Subject to any disclaimer, the term of this patent is extended or adjusted under 35 U.S.C. 154(b) by 53 days.

This patent is subject to a terminal disclaimer.

(21) Appl. No.: 17/373,582

(22) Filed: Jul. 12, 2021

(65) Prior Publication Data
US 2021/0344658 A1 Nov. 4, 2021

Related U.S. Application Data

(63) Continuation of application No. 16/256,852, filed on Jan. 24, 2019, now Pat. No. 11,095,628.

(51) Int. Cl.
*G06F 21/62* (2013.01)
*G06F 21/78* (2013.01)
(Continued)

(52) U.S. Cl.
CPC .......... *H04L 63/062* (2013.01); *H04L 9/0894* (2013.01); *H04L 63/0428* (2013.01); *H04L 2463/062* (2013.01)

(58) Field of Classification Search
CPC . H04L 63/062; H04L 9/0894; H04L 63/0428; H04L 2463/062
See application file for complete search history.

(56) References Cited

U.S. PATENT DOCUMENTS

| | | |
|---|---|---|
| 7,185,196 B1 | 2/2007 | Kuskin et al. |
| 7,376,968 B2 | 5/2008 | Ritz et al. |

(Continued)

OTHER PUBLICATIONS

Security in cloud computing: Opportunities and challenges. Ali. Elsevier. (Year: 2015).*

(Continued)

*Primary Examiner* — Venkat Perungavoor
(74) *Attorney, Agent, or Firm* — Joseph Mencher

(57) ABSTRACT

A key management system includes a managed system coupled to a management system through a network. The managed system includes managed device locking subsystem(s) coupled to a managed device and a key storage. The managed device locking subsystem(s) retrieve, through the network from the management system, a managed device locking key that is configured to unlock the managed device. The managed device locking subsystem(s) then encrypt the managed device locking key to provide an encrypted managed device locking key, and store the encrypted managed device locking key in the key storage. Subsequent to storing the encrypted managed device locking key, the managed device locking subsystem(s) retrieve the encrypted managed device locking key from the key storage, and decrypt the encrypted managed device locking key to provide a decrypted managed device locking key. The managed device locking subsystem(s) then use the decrypted managed device locking key to unlock the managed device.

20 Claims, 5 Drawing Sheets

(51) Int. Cl.
    *H04L 9/40*     (2022.01)
    *H04L 9/08*     (2006.01)
    *G06F 21/71*     (2013.01)

(56) References Cited

U.S. PATENT DOCUMENTS

| | | | | |
|---|---|---|---|---|
| 10,121,012 | B2* | 11/2018 | Mueller | H04L 9/0894 |
| 10,313,121 | B2* | 6/2019 | Young | G06F 21/575 |
| 10,489,574 | B2 | 11/2019 | Smith et al. | |
| 10,628,333 | B2* | 4/2020 | Kakutani | H04L 63/0428 |
| 2005/0111664 | A1* | 5/2005 | Ritz | G06F 21/575 |
| | | | | 380/255 |
| 2012/0233455 | A1 | 9/2012 | Kahler et al. | |
| 2012/0254602 | A1* | 10/2012 | Bhansali | G06F 21/31 |
| | | | | 713/2 |
| 2017/0249467 | A1* | 8/2017 | Mueller | G06F 21/6218 |
| 2018/0357442 | A1 | 12/2018 | Hamid | |
| 2019/0007204 | A1 | 1/2019 | Field et al. | |
| 2019/0065773 | A1 | 2/2019 | Whitmer | |
| 2020/0112435 | A1 | 4/2020 | Mueller et al. | |
| 2020/0186342 | A1 | 6/2020 | Zhang et al. | |
| 2020/0244445 | A1 | 7/2020 | Ponnusamy et al. | |
| 2020/0244454 | A1 | 7/2020 | Gupta et al. | |
| 2020/0244632 | A1 | 7/2020 | Gupta et al. | |
| 2020/0336472 | A1 | 10/2020 | Drummond et al. | |

OTHER PUBLICATIONS

Architecture for Protecting Critical Secrets in Microprocessors. Lee. IEEE. (Year: 2005).*
TZ-KMS: A Secure Key Management Service for Joint Cloud Computing with ARM TrustZone. Luo. IEEE. (Year: 2018).*
Chourishi et al., "Secure Content Sharing using Third Party with Broadcast Encryption for Stateless Receivers," 2009, 4 pages, IEEE.

* cited by examiner

DEVICE LOCKING KEY MANAGEMENT SYSTEM

CROSS-REFERENCE TO RELATED APPLICATIONS

The present disclosure is a continuation of U.S. patent application Ser. No. 16/256,852, filed on Jan. 24, 2019, the disclosure of which is incorporated herein by reference in its entirety.

BACKGROUND

The present disclosure relates generally to information handling systems, and more particularly to managing device locking keys for managed devices in an information handling system.

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Many information handling systems such as, for example, server systems in datacenters, may employ enhanced security by locking managed devices within the server system with device locking keys. For example, for many server systems in datacenters, network-based key management systems have been developed to provide for the centralized management of device locking keys used to lock managed devices in the server systems, with the server systems configured to retrieve those device locking keys via in-band methods (e.g., using operating system services provided via an application or agent running in the operating system on the server system) or out-of-band methods (e.g., via a remote access controller that operates independently of the operating system and uses a dedicated network connection to the key management system that is separate from that used by the operating system.) However, the use of such network-based key management systems can raise issues.

For example, managed devices such as storage devices or drives utilized in the booting of the server systems may often be locked via the device locking keys (e.g., storage device locking keys) discussed above. However, because those storage device locking keys are stored on the key management system, the booting, startup, resetting, and/or other initialization operations performed by the server system are delayed due to the need to retrieve the storage device locking key(s) that are required to unlock of the storage device(s) needed to initialize the server system. Such issues are exacerbated when the network in the datacenter becomes unavailable, as the server systems will not be able to retrieve their storage device locking keys at all, preventing those server systems from initializing until the network is once again available. As such, conventional network-based key management systems introduce delays in the use of managed devices, and operate to prevent the use of those managed devices in situations where a network connection to the network-based key management system is unavailable.

Accordingly, it would be desirable to provide an improved key management system.

SUMMARY

According to one embodiment, an Information Handling System (IHS) includes a managed device; a managed device locking key storage; at least one processing system that is coupled to the managed device and the managed device locking key storage; and at least one memory system that is coupled to the at least one processing system and that includes instructions that, when executed by the at least one processing system, cause the at least one processing system to provide at least one managed device locking subsystem that is configured to: retrieve, through a network from a management system, a managed device locking key that is configured to unlock the managed device; encrypt the managed device locking key to provide an encrypted managed device locking key; store the encrypted managed device locking key in the managed device locking key storage; retrieve, from the managed device locking key storage subsequent to storing the encrypted managed device locking key, the encrypted managed device locking key; decrypt the encrypted managed device locking key to provide a decrypted managed device locking key; and unlock, using the decrypted managed device locking key, the managed device.

DETAILED DESCRIPTION

For purposes of this disclosure, an information handling system may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an information handling system may be a personal computer (e.g., desktop or laptop), tablet computer, mobile device (e.g., personal digital assistant (PDA) or smart phone), server (e.g., blade server or rack server), a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, touchscreen and/or a video display. The information handling system may also include one or more buses operable to transmit communications between the various hardware components.

Figure 1:
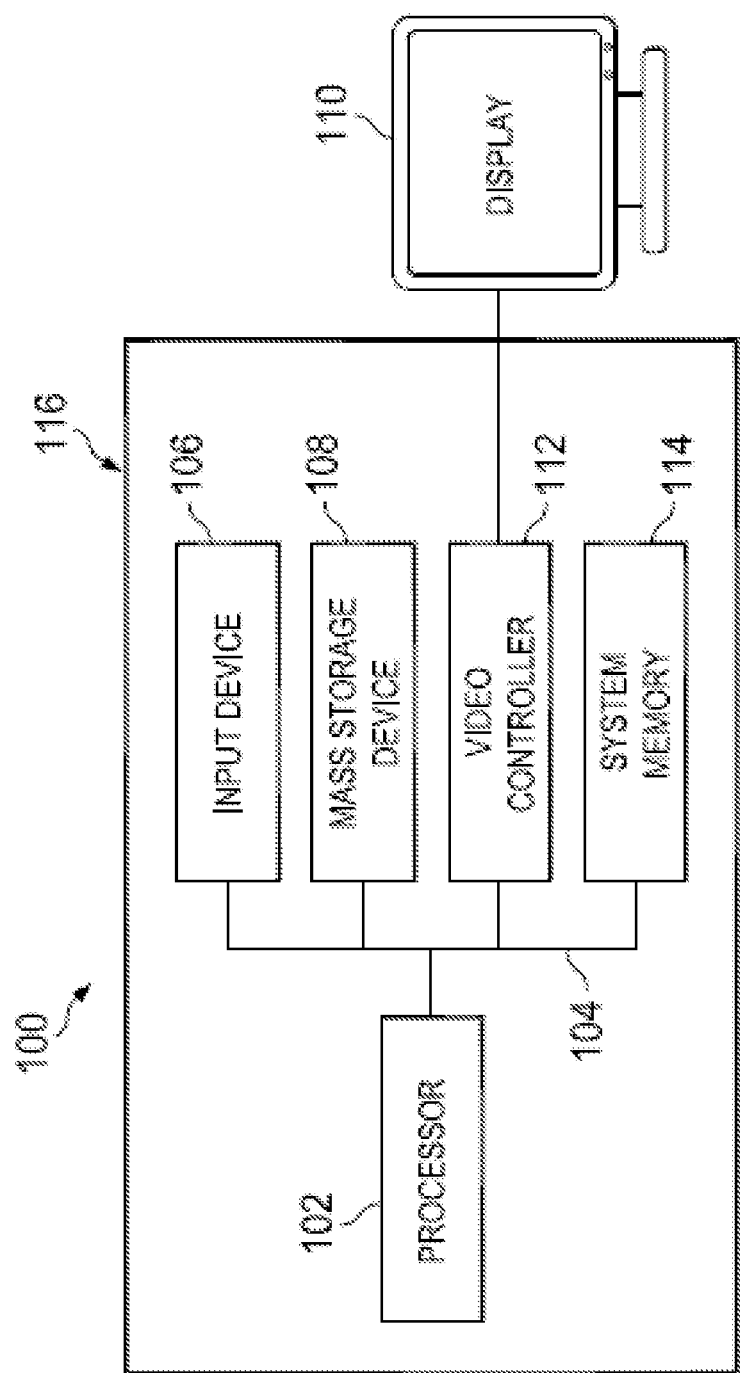
FIG. 1 is a schematic view illustrating an embodiment of an information handling system.

In one embodiment, IHS 100, FIG. 1, includes a processor 102, which is connected to a bus 104. Bus 104 serves as a connection between processor 102 and other components of IHS 100. An input device 106 is coupled to processor 102 to provide input to processor 102. Examples of input devices may include keyboards, touchscreens, pointing devices such as mouses, trackballs, and trackpads, and/or a variety of other input devices known in the art. Programs and data are stored on a mass storage device 108, which is coupled to processor 102. Examples of mass storage devices may include hard discs, optical disks, magneto-optical discs, solid-state storage devices, and/or a variety other mass storage devices known in the art. IHS 100 further includes a display 110, which is coupled to processor 102 by a video controller 112. A system memory 114 is coupled to processor 102 to provide the processor with fast storage to facilitate execution of computer programs by processor 102. Examples of system memory may include random access memory (RAM) devices such as dynamic RAM (DRAM), synchronous DRAM (SDRAM), solid state memory devices, and/or a variety of other memory devices known in the art. In an embodiment, a chassis 116 houses some or all of the components of IHS 100. It should be understood that other buses and intermediate circuits can be deployed between the components described above and processor 102 to facilitate interconnection between the components and the processor 102.

Figure 2:
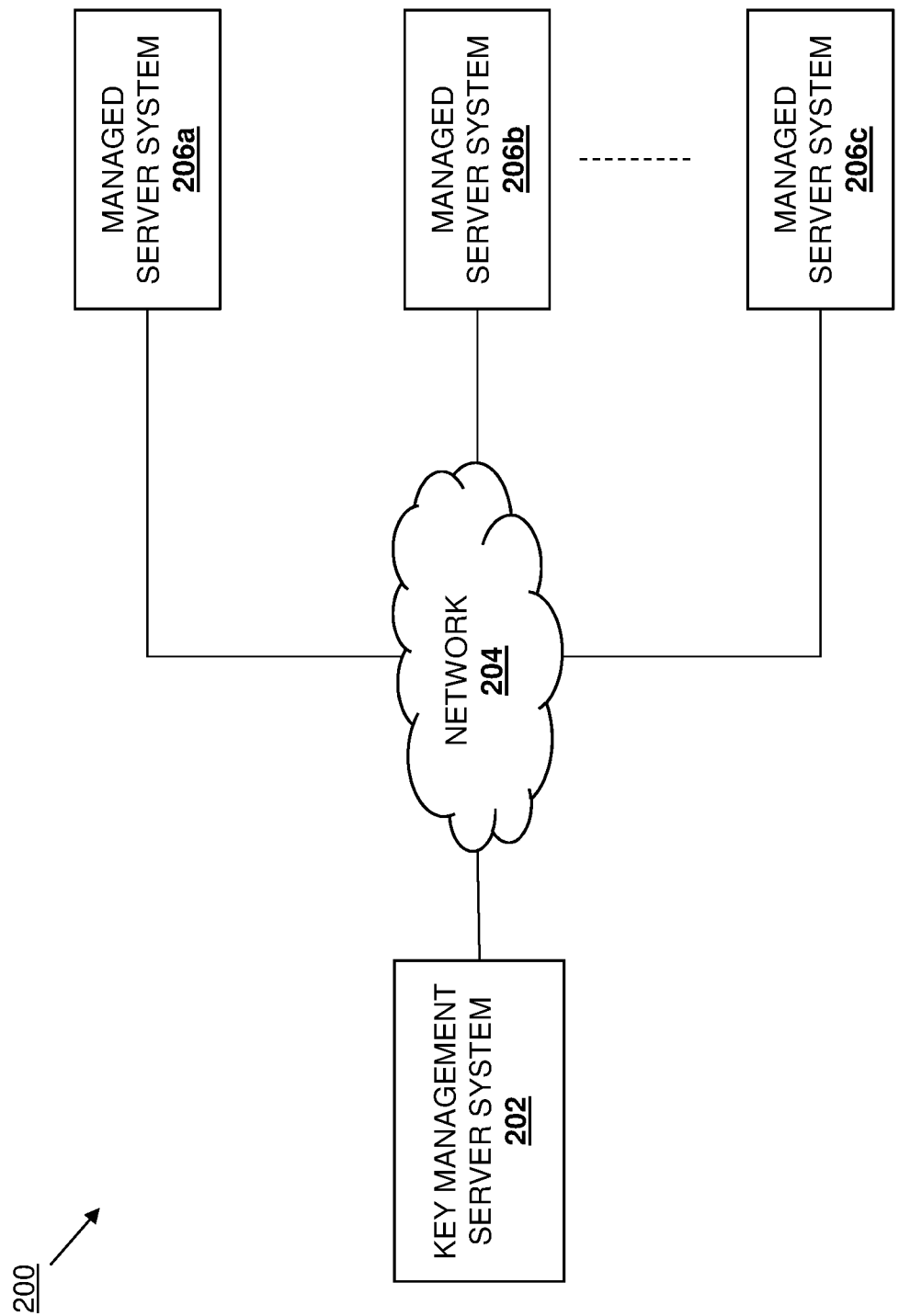
FIG. 2 is a schematic view illustrating an embodiment of a key management system.

Referring now to FIG. 2, an embodiment of a key management system 200 is illustrated. As discussed below, the key management system 200 includes a management system that may be provided by one or more of the IHSs 100 discussed above with reference to FIG. 1, and/or that may include any or all of the components of the IHS 100. In the illustrated embodiment, the management system is provided by a key management server system 202 that may include one or more server devices, although other computing devices may be utilized to provide the management system while remaining within the scope of the present disclosure as well. In a specific example, the key management server system 202 includes one or more server devices that are configured according to the Key Management Interoperability Protocol (KMIP), which one of skill in the art in possession of the present disclosure will recognize is an extensible communication protocol that defines message formats for the manipulation of cryptographic keys via server device(s) providing the key management server system 202, which facilitates data encryption by simplifying encryption key management. As such, keys may be created on a server and then retrieved, possibly wrapped by other keys, with both symmetric and asymmetric keys supported, and including the ability to sign certificates. One of skill in the art in possession of the present disclosure will recognize that the KMIP also allows for clients to ask a server to encrypt or decrypt data, without needing direct access to the key. However, while a specific protocol is discussed herein as being utilized by the key management system 200, one of skill in the art in possession of the present disclosure will recognize that keys may be managed according to the teachings of the present disclosure via a variety of key management protocols while remaining within the scope of the present disclosure as well.

In the illustrated embodiment, the key management server system 202 is coupled to a network 204 that may be provided by a Local Area Network (LAN), the Internet, and/or any other network that would be apparent to one of skill in the art in possession of the present disclosure. Furthermore, a plurality of managed systems may be coupled to the management system of the present disclosure via the network 204. In an embodiment, any or all of the managed systems may be provided by the IHS 100 discussed above with reference to FIG. 1, and/or may include any or all of the components of the IHS 100. For example, in the illustrated embodiment, the managed systems are provided by managed server systems 206a, 206b, and up to 206c, each of which is coupled through the network 204 to the key management server system 202. While one of skill in the art in possession of the present disclosure will recognize that the embodiment discussed below describe a datacenter including a datacenter network that couples together the key management server system and the managed server systems, any of a variety of managed systems may be coupled to a management system via a network while operating according to the teachings of the present disclosure, and those embodiments are envisioned as falling within the scope of the present disclosure as well.

Figure 3:
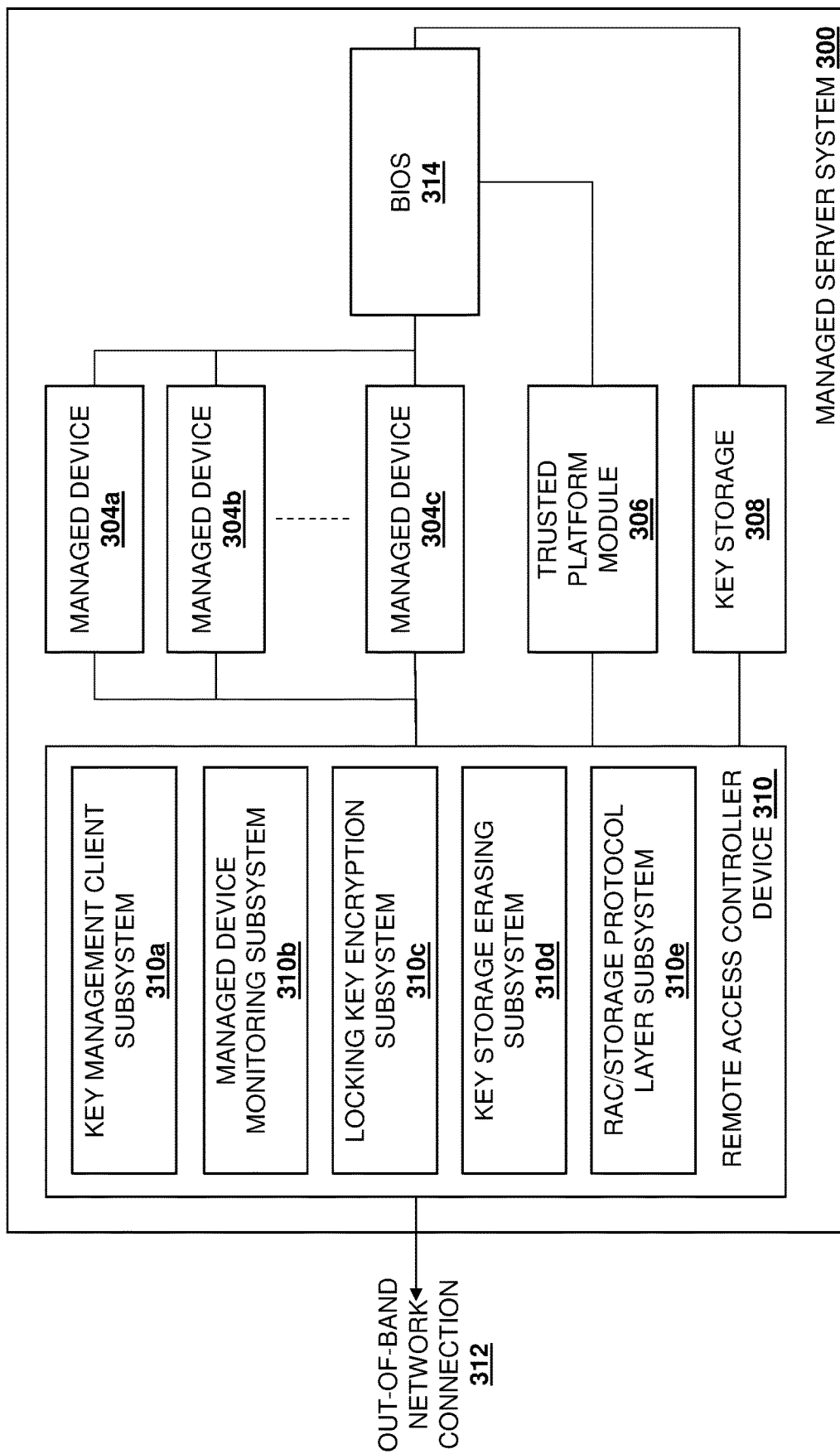
FIG. 3 is a schematic view illustrating an embodiment of a server system used in the key management system of FIG. 2.

Referring now to FIG. 3, an embodiment of a managed system provided by a managed server system 300 is illustrated. The managed server system 300 may be any or all of the managed server systems 206a-c discussed above with reference to FIG. 2 and, as such, may be provided by the IHS 100 discussed above with reference to FIG. 1, and/or may include any or all of the components of the IHS 100. In the illustrated embodiment, the managed server system 300 includes a chassis 302 that houses the components of the managed server system 300, only some of which are illustrated in FIG. 3. In the illustrated embodiment, the chassis 302 houses a plurality of managed devices 304a, 304b, and up to 304c. In the examples provided below, the managed devices 304a-c are provided by storage devices and, in particular, bootable storage devices via which the managed server device 300 is configured to access data in order to boot, start up, reset, or otherwise initialize. However, one of skill in the art in possession of the present disclosure will recognize that the managed devices 304a-c may be provided by any devices that are configured to be locked and unlocked using the device locking keys provided via the key management server system 202, discussed above.

The chassis 302 may also house an encryption key module that, in the illustrated embodiment, is provided by a Trusted Platform Module (TPM) 306. As would be recognized by one of skill in the art in possession of the present disclosure, the TPM 306 may be provided according to international TPM standards for secure crypto-processors, and may include a dedicated microcontroller that is configured to secure hardware via integrated cryptographic keys. As such, the TPM 306 may be configured to securely generate and/or store encryption keys for use in the manners described below. However, one of skill in the art in possession of the present disclosure will recognize that while a TPM 306 is illustrated and described, a variety of encryption key modules may be utilized while remaining within the scope of the present disclosure as well. The chassis 302 may also house a storage system (not illustrated, but which may include the storage device 108 discussed above with reference to FIG. 1) that provides a key storage 308 that is configured to store the encrypted managed device locking keys described herein. In some examples, the key storage 308 may be provided by a shared Non-Volatile Random Access Memory (NVRAM) device such as, for example, a Basic Input/Output System (BIOS) Serial Peripheral Interface (SPI) storage. In other examples, the key storage 308 may be provided by a dedicated, reserved Non-Volatile Memory express (NVMe) device namespace storage. However, while a few specific examples have been described, one of skill in the art in possession of the present disclosure will recognize that the key storage 308 may be provided by a variety of storage systems while remaining within the scope of the present disclosure as well.

As discussed below, the chassis 302 may house at least one processing system (not illustrated, but which may include the processor 102 discussed above with reference to FIG. 1) and at least one memory system (not illustrated, but which may include the memory 114 discussed above with reference to FIG. 1) that is coupled to the at least one processing system and that includes instructions that, when executed by the at least one processing system, cause the at least one processing system to provide at least one managed device locking subsystem that is configured to perform the functionality of the managed device locking subsystems discussed below. As also discussed below, any or all of the managed device locking subsystem(s) may be coupled to each of the managed devices 304a-c, the TPM 306, and the key storage 308.

For example, in the illustrated embodiment, the chassis 302 houses a remote access controller device 310 that provides a first managed device locking subsystem that is coupled to each of the managed devices 304a-c, the TPM 306, and the key storage 308. In a specific example, the remote access controller device 310 may be provided by, for example, an integrated DELL® Remote Access Controller (iDRAC®) available from DELL® Inc. of Round Rock, Tex., United States. As would be understood by one of skill in the art in possession of the present disclosure, remote access controller devices may provide an out-of-band management platform for server systems (e.g., via a separate expansion card, or integrated into the main circuit board as with the iDRAC® discussed above), and may operate using remote access controller resources that are separate from the server resources utilized by the server system, while providing a browser-based-interface and/or command-line-interface for allowing users to manage and monitor the server system. As discussed below, the remote access controller device 310 may include a remote access controller processing system (not illustrated, but which may include the processor 102 discussed above with reference to FIG. 1) and a remote access controller memory system (not illustrated, but which may include the memory 114 discussed above with reference to FIG. 1) that is coupled to the remote access controller processing system and that includes instructions that, when executed by the remote access controller processing system, cause the remote access controller processing system to provide the remote access controller that is configured to perform the functionality of the remote access controllers discussed below.

For example, the remote access controller provided by the remote access controller device 310 may include a key management client subsystem 310a such as, for example, a KMIP client that is configured to connect to the key management server system 202 through the network 204 via an out-of-band network connection 312 provided for the remote access controller device 310 (and which may be separate from a network connection (not illustrated) utilized by other components of the server system 300) in order to, for example, retrieve drive locking key(s) from the key management server system 202 and/or perform any of the other key management client subsystem functionality discussed below. Furthermore, the remote access controller provided by the remote access controller device 310 may include a managed device monitoring subsystem 310b such as, for example, a boot storage device monitor that is configured to monitor a boot storage device order for the managed server system 300 and/or perform any of the other managed device monitoring subsystem functionality discussed below. Further still, the remote access controller provided by the remote access controller device 310 may include a locking key encryption subsystem 310c such as, for example, a device locking key encapsulator that is configured to bundle and encrypt storage device locking keys with associated storage device identifiers and store those bundles in the key storage 308, and/or perform any of the other locking key encryption subsystem functionality discussed below.

Further still, the remote access controller provided by the remote access controller device 310 may include a key storage erasing subsystem 310d such as, for example, a cache cleaner that is configured to erase storage device locking keys in the key storage 308 and/or perform any of the other key storage erasing subsystem functionality discussed below. Further still, the remote access controller provided by the remote access controller device 310 may include a Remote Access Controller (RAC)/storage protocol layer subsystem 310e that is configured to provide a protocol layer between the remote access controller and a storage controller for the storage devices, and/or perform any of the other RAC/storage protocol layer subsystem functionality discussed below. However, while specific subsystems and functionality of the remote access controller provided by the remote access controller device 310 have been illustrated and described, one of skill in the art in possession of the present disclosure will recognize that the functionality described below may be provided via a variety of different subsystems and/or subsystem configurations while remaining within the scope of the present disclosure as well.

In the illustrated embodiment, the chassis 302 also houses a BIOS 314 that provides a second managed device locking subsystem that is coupled to each of the managed devices 304a-c, the TPM 306, and the key storage 308. As would be understood by one of skill in the art in possession of the present disclosure, a BIOS may be provided by non-volatile firmware and may be used to perform hardware initialization during a booting process (e.g., power-on startup) for the managed server system 300, as well as provide runtime services for operating systems and applications running on the managed server system 300. Furthermore, while discussed as a BIOS below, one of skill in the art in possession of the present disclosure will recognize that the BIOS 314 may be provided according to the Unified Extensible Firmware Interface (UEFI) specification, which defines a software interface between an operating system and platform firmware in the managed server system 300, and was provided to replace the BIOS firmware interface while providing legacy support for BIOS services. As discussed below, the BIOS 314 may include a BIOS processing system (not illustrated, but which may include the processor 102 discussed above with reference to FIG. 1 and/or components with similar processing functionality) and a BIOS memory system (not illustrated, but which may include the memory 114 discussed above with reference to FIG. 1 and/or components with similar memory functionality) that is coupled to the BIOS processing system and that includes instructions that, when executed by the BIOS processing system, cause the BIOS processing system to provide the BIOS 314 that is configured to perform the functionality of the BIUOS 314 discussed below. However, while a specific managed server system 300 has been illustrated and described, one of skill in the art in possession of the present disclosure will recognize that server systems may include a variety of components and/or component configurations while remaining within the scope of the present disclosure as well.

Figure 4A:
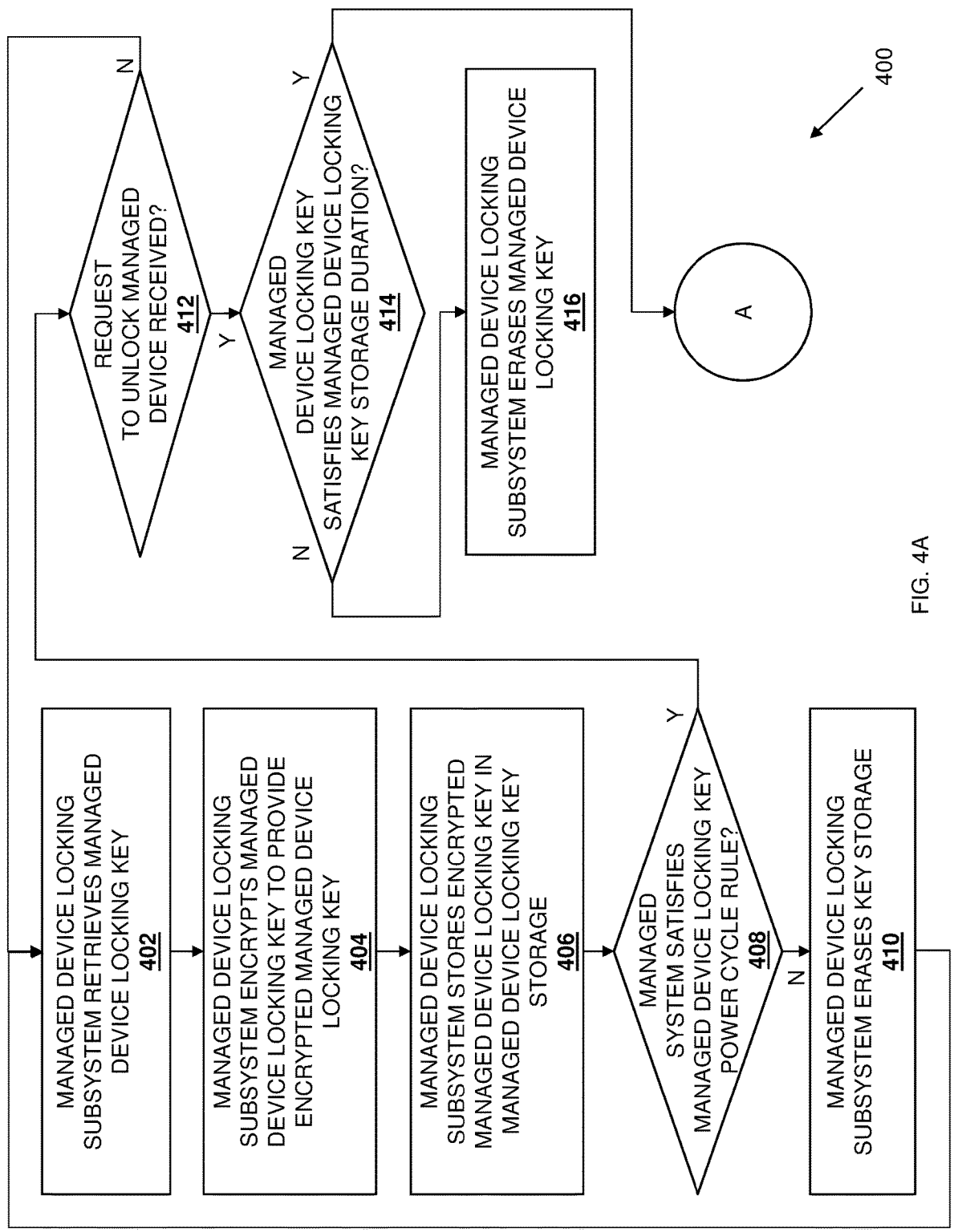
FIG. 4A is a portion of a flow chart illustrating an embodiment of a method for managing keys.
Figure 4B:
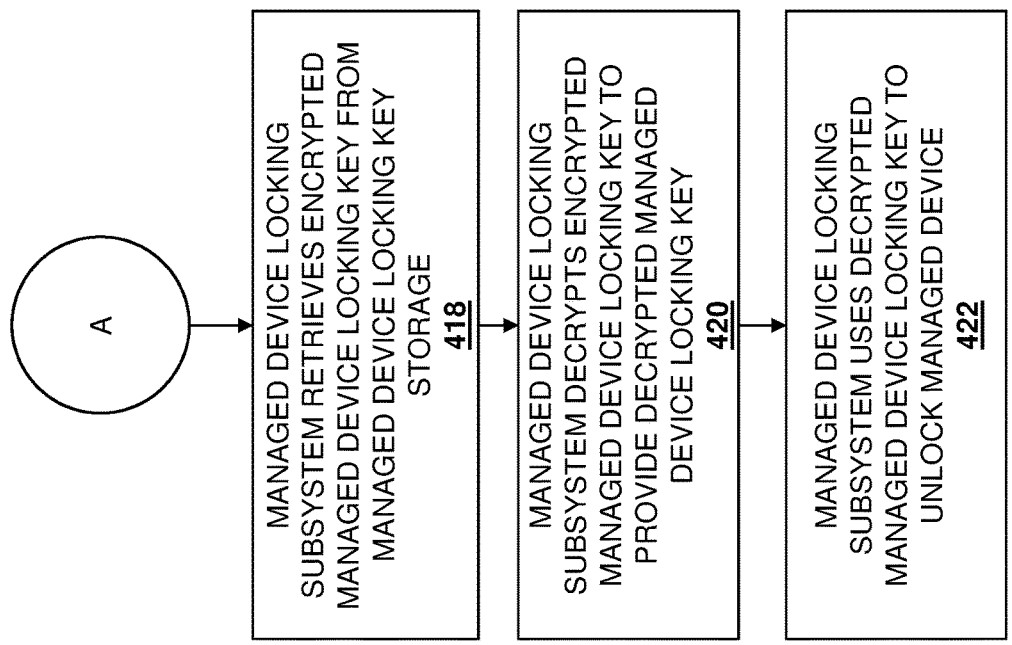
FIG. 4B is a portion of a flow chart illustrating an embodiment of the method for managing keys.

Referring now to FIGS. 4A and 4B, an embodiment of a method 400 for managing device locking keys is illustrated. As discussed below, the systems and methods of the present disclosure provide for the management of managed device locking keys locally by a managed system to ensure quick unlocking and subsequent access to managed device(s) in the managed system, as well as to ensure access to managed devices in the managed system when a network connection to a management system is unavailable. In an embodiment, the systems and methods of the present disclosure include a managed server system with one or more managed bootable storage devices, and a remote access controller device in the managed server system is configured to monitor the managed bootable storage devices to identify which managed bootable storage device(s) are designated as managed boot storage device(s) for use in initializing the managed server system. Upon identifying the managed boot storage device(s), the remote access controller device may retrieve device locking key(s) from a key management server system via a network, as well as encryption key(s) from a Trusted Platform Module (TPM) in the managed server system, and use the encryption key(s) to encrypt the device locking key(s) to provide encrypted device locking key(s). The remote access controller device then stores the encrypted device locking key(s) in a key storage (e.g., a BIOS SPI storage, an NVMe device namespace storage, etc.)

Subsequently, in some embodiments, the managed server system initializes and the remote access controller device may retrieve the encrypted device locking key(s) from the key storage, as well as the encryption key(s) from the TPM, and use the encryption key(s) to decrypt the encrypted device locking key(s) to provide decrypted device locking key(s). The remote access controller device may then use the decrypted device locking key(s) to unlock the managed boot storage device(s) so that it/they may be used to initialize the managed server device. In other embodiments, the network connection to the key management server system may become unavailable, and upon managed server system initialization the remote access controller may retrieve the encrypted device locking key(s), decrypt it/them, and use the decrypted device locking key(s) to unlock the managed boot storage device(s). In yet other embodiments, the remote access controller may become unavailable, and upon managed server system initialization a BIOS in the managed server system may retrieve the encrypted device locking key(s) from the key storage, as well as the encryption key(s) from the TPM, and use the encryption key(s) to decrypt the encrypted device locking key(s) to provide decrypted device locking key(s). The BIOS may then use the decrypted device locking key(s) to unlock the managed boot storage device(s) so that it/they may be used to initialize the managed server device. In some embodiments, the storage of the encrypted device locking key(s) in the key storage may be subject to storage durations that cause that encrypted device locking key(s) to be erased from the key storage after some time period. In some embodiments, the managed server system may be subject to power cycle rules that cause any encrypted device locking key(s) in the key storage to be erased if power is removed from the managed server system. As such, the local management of device locking keys is provided to increase access times and ensure access to managed devices, while also ensuring security of the device locking keys and their managed devices.

The method 400 begins at block 402 where a managed device locking subsystem retrieves a managed device locking key. In an embodiment, at block 402, the remote access controller provided by the remote access controller device 310 may utilize the out-of-band connection 312 over the network 204 to the key management server system 202 in order to retrieve a managed device locking key for the managed device 304a. For example, at or before block 402, the managed device monitoring subsystem 310b may monitor the managed devices 304a-c for an event that triggers the retrieval of a managed device locking key. In a specific example, the managed device monitoring subsystem 310b may be a boot storage device monitor that monitors managed bootable storage devices (provided by the managed devices 304a-c in this example) to identify when any of those managed bootable storage devices have been designated as a managed boot storage device for use by the managed server system 300 during initialization. As such, any change in an order of managed boot storage devices, an addition of a managed boot storage device to the managed server system 300, and/or other managed boot storage device activities that would be apparent to one of skill in the art in possession of the present disclosure, will be detected by the boot storage device monitor.

In response to detecting the event associated with the managed device 304a (e.g., designation of the managed bootable storage device 304a as the managed boot storage device for the managed server system 300 in the example above), the managed device monitoring subsystem 310b may cause the key management client subsystem 310a to utilize the out-of-band connection 312 over the network 204 to the key management server system 202 in order to retrieve a managed device locking key for the managed device 304a. While the retrieval of a single managed device locking key for a single managed device 304a is described below, one of skill in the art in possession of the present disclosure will recognize that events associated with multiple managed devices may trigger the retrieval of managed device locking keys for each of those managed devices while remaining within the scope of the present disclosure as well. For example, a managed bootable storage device may be added to the managed server system 300, and/or a new managed boot storage device order may be set using that managed bootable storage device (and/or other managed bootable storage devices in the managed server system 300), which may require the retrieval of respective managed device locking keys for each of the managed boot storage devices provided as managed boot storage devices in the managed boot storage device order.

In some embodiments, the managed device locking key retrieved at block 402 may be a Key Encryption Key (KEK) for the managed device 304a. As would be understood by one of skill in the art in possession of the present disclosure, a KEK may be generated using a password, and that KEK may then be utilized to encrypt a Data Encryption Key (DEK) that can then be used to encrypt data on a storage device. In some examples, a DEK may be randomly generated, with a password used to create a KEK in order to encrypt that DEK, which allows the password to be changed without having to decrypt and re-encrypt data on a storage device (rather, the DEK may just be re-encrypted with a new KEK generated using the new password.) However, while a specific device locking key has been described, one of skill in the art in possession of the present disclosure will recognize that a variety of device locking key schemes may be utilized that will fall within the scope of the present disclosure as well. Furthermore, while not described herein in detail, one of skill in the art in possession of the present disclosure will recognize that the managed device locking key(s) retrieved at block 402 may be utilized to lock managed device(s) in a variety of manners that will fall within the scope of the present disclosure as well.

The method 400 then proceeds to block 404 where the managed device locking subsystem encrypts the managed device locking key to provide an encrypted managed device locking key. In an embodiment, at block 404, the remote access controller provided by the remote access controller device 310 may retrieve an encryption key from an encryption key module in the managed server system 300, and use that encryption key to encrypt the managed device locking key that was retrieved at block 402 in order to provide an encrypted managed device locking key. While not described in detail, one of skill in the art in possession of the present disclosure will recognize that the retrieval of encryption keys from the TPM 306 may involve authentication by the remote access controller with the TPM 306 and/or other encryption key retrieval/TPM communication actions known in the art.

For example, at block 404, the locking key encryption subsystem 310c may retrieve the managed device locking key from the key management client subsystem 310a, retrieve an encryption key from the TPM 306, and use the encryption key to encrypt the managed device locking key in order to provide an encrypted managed device locking key. In a specific example, the locking key encryption subsystem 310c may be a device locking key encapsulator such as a KEK encapsulator that is configured to bundle the KEK retrieved at block 402 along with a managed device unique identifier for the managed device 304a (i.e., the managed device for which that KEK was retrieved), and encrypt that bundle using an encryption key retrieved from the TPM 306. As such, for any managed device for which a respective managed device locking key is retrieved, an encrypted managed device locking key may be generated using an encryption key (from the TPM 306) to encrypt that respective managed device locking key and a unique identifier for that managed device. However, while a specific example of the encryption of a managed device locking key has been described, one of skill in the art in possession of the present disclosure will recognize that managed device locking keys may be encrypted or otherwise protected in a variety of manners while remaining within the scope of the present disclosure as well. For example, the BIOS 314 may retrieve the managed device locking key from the remote access controller provided by the remote access controller device 310, retrieve the encryption key from the TPM 306, and use that encryption key to encrypt the managed device locking key and provide the encrypted managed device locking key in substantially the same manner discussed above as being performed by the remote access controller.

The method 400 then proceeds to block 406 where the managed device locking subsystem stores the encrypted managed device locking key in a managed device locking key storage. In an embodiment, at block 406, the remote access controller provided by the remote access controller device 310 may store the encrypted managed device locking key generated at block 404 in the key storage 308. For example, in response to providing the encrypted managed device locking key at block 404, the locking key encryption subsystem 310c may operate to store that encrypted managed device locking key in the key storage 308, which as discussed above may be provided by a BIOS SPI storage, an NVMe device namespace storage, and/or other storage subsystems that would be apparent to one of skill in the art in possession of the present disclosure. In another example, in response to providing the encrypted managed device locking key at block 404, the BIOS 314 may operate to store that encrypted managed device locking key in the key storage 308 in substantially the same manner discussed above being performed by the remote access controller. As such, following block 406 of the method 400, the key storage 308 may store encrypted managed device locking key(s) associated with any or all of the managed devices 304a-c (e.g., managed bootable storage devices designated as managed boot storage devices).

The method 400 then proceeds to decision block 408 where it is determined whether the managed system satisfies a managed device locking key power cycle rule. In some embodiments, unauthorized access to the managed device locking keys stored in the key storage 308 may be protected against via the use of a managed device locking key power system rule, which may operate to eliminate the possible unauthorized access to the managed device locking keys if the managed server system 300 is stolen (and the encryption key(s) in the TPM 306 are accessed and used to decrypt the encrypted managed device locking key(s).) As such, at decision block 408, the remote access controller provided by the remote access controller device 310 may monitor power provided to the managed server system 300 and determine whether the managed system satisfies a managed device locking key power cycle rule. In the examples below, the managed device locking key power cycle rule may require that the managed server system 300 continue to receive power in order for any encrypted managed device locking keys to be maintained in the key storage 308, and that any power cycling of the managed server system 300 (e.g., the removal of power from the managed server system 300 in the event the managed server system 300 is disconnected from its power source and stolen) should result in the erasing of the key storage 308. In a specific example, the key storage erasing subsystem 310d may operate at decision block 408 to monitor the power provided to the managed server system 300 and determine whether the managed system satisfies the managed device locking key power cycle rule.

If, at decision block 408, it is determined that the managed system does not satisfy the managed device locking key power cycle rule, the method 400 proceeds to block 410 where the managed device locking subsystem erases the key storage. In an embodiment, at block 410, the remote access controller provided by the remote access controller device 310 operates to erase any encrypted managed device locking keys that are stored in the key storage 308. In a specific example, the key storage erasing subsystem 310d may operate at block 410 to erase any encrypted managed device locking keys that are stored in the key storage 308. As such, the removal of power from the managed server system 300 (e.g., the removal and theft of the managed server system 300 from a datacenter) will cause any encrypted managed device locking keys stored in its key storage 308 to be erased, and thus their associated managed device locking keys that were locally stored in the key storage 308 will be unavailable to unlock the managed devices 304a-c (even in the event the encryption key(s) in the TPM 306 are accessed). The method 400 may then return to block 402 and proceed substantially as discussed above.

If, at decision block 408, it is determined that the managed system satisfies the managed device locking key power cycle rule, the method 400 proceeds to decision block 412 where it is determined whether a request to unlock a managed device has been received. In some embodiments, at decision block 412, the remote access controller provided by the remote access controller device 310 may determine whether a request to unlock a managed device has been received. In some embodiments in which the remote access controller provided by the remote access controller device 310 is available/operational, the unlocking of managed device(s) may always be performed using the encrypted managed device locking keys stored in the key storage 308 when those encrypted managed device locking keys are available. For example, the booting, startup, resetting, or initialization of the managed server system 300 requires the use of managed boot storage device(s) provided by the managed devices 304a, 304b, and/or 304c, and at decision block 412, the remote access controller provided by the remote access controller device 310 may determine whether the managed server system 300 has been initialized and a managed boot storage device must be unlocked to continue that initialization.

In some embodiments in which the remote access controller provided by the remote access controller device 310 is available/operational, the unlocking of managed device(s) may only be performed using the encrypted managed device locking keys stored in the key storage 308 when those encrypted managed device locking keys are available and a network connection to the key management server system 202 is unavailable. For example, the booting, startup, resetting, or initialization of the managed server system 300 requires the use of managed boot storage device(s) provided by the managed devices 304a, 304b, and/or 304c, and managed device locking keys may be retrieved via the network 202 from the key management server system 202 to do so whenever that network connection is available, while the encrypted managed device locking keys stored in the key storage 308 may be used to do so when a network connection to the key management server system 202 is unavailable. As such, in some embodiments of decision block 412, the remote access controller provided by the remote access controller device 310 may determine whether the managed server system 300 has been initialized and a managed boot storage device must be unlocked to continue that initialization, and whether the network connection to the key management server system 202 is unavailable.

In some embodiments in which the remote access controller provided by the remote access controller device 310 is unavailable, the unlocking of managed device(s) may be performed by the BIOS 314 using the encrypted managed device locking keys stored in the key storage 308. For example, the booting, startup, resetting, or initialization of the managed server system 300 requires the use of managed boot storage device(s) provided by the managed devices 304a, 304b, and/or 304c, and in the event the remote access controller provided by the remote access controller device 310 is not operational, the encrypted managed device locking keys stored in the key storage 308 may be retrieved by the BIOS 314 and used to unlock the managed boot storage device(s). As such, in some embodiments of decision block 412, the BIOS 314 may determine whether the managed server system 300 has been initialized and a managed boot storage device must be unlocked to continue that initialization, and whether the remote access controller provided by the remote access controller device 310 is unavailable.

If, at decision block 412, it is determined that no request to unlock a managed device has been received, the method 400 returns to block 402 and proceeds substantially as discussed above. As such, once managed device locking key(s) have been stored in the key storage 308, the remote access controller provided by the remote access controller device 310 and/or the BIOS 314 will operate to monitor for requests to unlock managed devices in the managed server system 300 as discussed above. If, at decision block 412, it is determined that a request to unlock a managed device has been received, the method 400 proceeds to decision block 414 where it is determined whether a managed device locking key satisfies a managed device locking key storage duration.

In some embodiments, access to the managed device locking keys stored in the key storage 308 may be limited via the use of a managed device locking storage duration, which may operate to ensure that encrypted managed device locking keys are only stored in the key storage 308 for some time period before they are erased. As such, at decision block 414 and in embodiments in which the remote access controller provided by the remote access controller device 310 has determined that a request to unlock a managed device has been received, the remote access controller provided by the remote access controller device 310 may determine an amount of time a managed device locking key for that managed device has been stored in the key storage 308. For example, the key storage erasing subsystem 310d may identify the managed device 304a based on a request received to unlock the managed device 304a, and may use the identity of the managed device 304a to identify an encrypted managed device locking key that was provided in the key storage 308 for that managed device 304a. The key storage erasing subsystem 310d may then determine whether that encrypted managed device locking key has been stored in the key storage 308 for longer than a managed device locking key storage duration, which will often be a number of days, but which one of skill in the art will recognize may be seconds, minutes, hours, weeks, months, and/or any other time period that may rely on a security level desired by a user of the managed server system 300.

Furthermore, at decision block 414 and in embodiments in which the BIOS 314 has determined that a request to unlock a managed device has been received (when the remote access controller provided by the remote access controller device 314 is unavailable), the BIOS 314 may determine an amount of time a managed device locking key for that managed device has been stored in the key storage 308. For example, the BIOS 314 may identify the managed device 304a based on a request received to unlock the managed device 304a, and may use the identity of the managed device 304a to identify an encrypted managed device locking key that was provided in the key storage 308 for that managed device 304a. The BIOS 314 may then determine whether that encrypted managed device locking key has been stored in the key storage 308 for longer than a managed device locking key storage duration. While a few examples of determining whether encrypted managed device locking keys satisfy managed device locking key storage durations subsequent to receiving a request to unlock a managed device have been described, one of skill in the art in possession of the present disclosure will appreciate that the determination of whether encrypted managed device locking keys satisfy managed device locking key storage durations may be performed at any time (e.g., by the remote access controller provided by the remote access controller device 310, by the BIOS 314, by other subsystems in the managed server system 300, etc.) while remaining within the scope of the present disclosure as well.

If, at decision block 414, it is determined that the managed device locking key does not satisfy the managed device locking key storage duration, the method 400 proceeds to block 416 where the managed device locking subsystem erases the managed device locking key. In an embodiment in which the remote access controller provided by the remote access controller device 310 is available/operational, at block 416, the remote access controller provided by the remote access controller device 310 may operate to erase the managed device locking key(s) that do not satisfy the managed device locking key storage duration from the key storage 308. For example, at block 416 the key storage erasing subsystem 310d may access the key storage 308 and erase any managed device locking key from the key storage 308 that does not satisfy the managed device locking key storage duration. Similarly, in an embodiment of block 416 in which the remote access controller provided by the remote access controller device 310 is not available/operational, the BIOS 314 may operate to erase the managed device locking key(s) that do not satisfy the managed device locking key storage duration from the key storage 308.

If, at decision block 414, it is determined that the managed device locking key satisfies the managed device locking key storage duration, the method 400 proceeds to block 418 where the managed device locking subsystem retrieves the encrypted managed device locking key from the managed device locking key storage. In embodiments in which the remote access controller provided by the remote access controller device 310 is available/operational, at block 418, the remote access controller provided by the remote access controller device 310 retrieves the encrypted managed device locking key from the key storage 308. For example, the key management client subsystem 310a may use the identity of the managed device 304a (for which the request to unlock was received at decision block 412) to retrieve the encrypted managed device locking key for the managed device 304a from the key storage 308. In embodiments in which the remote access controller provided by the remote access controller device 310 is not available/operational, at block 418, the BIOS 314 may use the identity of the managed device 304a (for which the request to unlock was received at decision block 412) to retrieve the encrypted managed device locking key for the managed device 304a from the key storage 308.

The method 400 then proceeds to block 420 where the managed device locking subsystem decrypts the encrypted managed device locking key to provide a decrypted managed device locking key. In embodiments in which the remote access controller provided by the remote access controller device 310 is available/operational, at block 420, the remote access controller provided by the remote access controller device 310 retrieves the encryption key from the TPM 306. For example, the key management client subsystem 310a may use the identity of the managed device 304a (for which the request to unlock was received at decision block 412) to retrieve the encryption key from the TPM 306 that was used to encrypt the managed device locking key for that managed device 304a in order to provide its associated encrypted managed device locking key. The key management client subsystem 310a may then use that encryption key to decrypt the encrypted managed device locking key in order to provide a decrypted managed device unlocking key. In embodiments in which the remote access controller provided by the remote access controller device 310 is not available/operational, at block 420, the BIOS 314 may use the identity of the managed device 304a (for which the request to unlock was received at decision block 412) to retrieve the encryption key from the TPM 306 that was used to encrypt the managed device locking key for that managed device 304a in order to provide its associated encrypted managed device locking key. The BIOS 314 may then use that encryption key to decrypt the encrypted managed device locking key in order to provide a decrypted managed device unlocking key.

The method 400 then proceeds to block 422 where the managed device locking subsystem uses the decrypted managed device locking key to unlock a managed device. In embodiments in which the remote access controller provided by the remote access controller device 310 is available/operational, at block 422, the remote access controller provided by the remote access controller device 310 uses the decrypted managed device locking key to unlock the managed device for which the request to unlock was received at decision block 412. For example, the RAC/storage protocol layer subsystem 310e may operate to use the decrypted managed device locking key to unlock the managed device 304a. In embodiments in which the remote access controller provided by the remote access controller device 310 is not available/operational, at block 422, the BIOS 314 may operate to use the decrypted managed device locking key to unlock the managed device 304a. As such, following block 422, the managed device 304a is unlocked and ready for use/access by the managed server system 300. In the specific examples discussed below, following block 422, the managed boot storage device is unlocked, and components (e.g., the BIOS 314, a CPU, etc.) may utilize data on the managed boot storage device to complete an initialization operation for the managed server system 300.

Thus, systems and methods have been described that provide for the management of managed device locking keys locally by a managed system to ensure quick access to managed device(s) in the managed system, as well as to ensure access to managed devices in the managed system when a network connection to a management system is unavailable. In some embodiments, a remote access controller may monitor managed bootable storage devices to identify managed bootable storage device(s) designated as managed boot storage device(s) for use in initializing a managed server system and, for each managed boot storage device identified, retrieve a device locking key from a key management server system via a network, as well as an encryption key from a Trusted Platform Module (TPM) in the managed server system. The remote access controller may then use that encryption key to encrypt the device locking key to provide an encrypted device locking key, and store the encrypted device locking key in a key storage. Subsequently, the managed server system may initialize. If the remote access controller device is available/operation, it may decrypt the encrypted device locking key that was stored in the key storage using the encryption key from the TPM, and use the decrypted device locking key to unlock the managed boot storage device so that it may be used to initialize the managed server device. If the remote access controller is unavailable, a BIOS may decrypt the encrypted device locking key that was stored in the key storage using the encryption key from the TPM, and use the decrypted device locking key to unlock the managed boot storage device so that it may be used to initialize the managed server device. The systems and methods of the present disclosure provide for the local management of device locking keys to decrease access times and ensure access to managed devices, while also ensuring security of the device locking keys and their managed devices by erasing managed device locking keys from local key storage after some time period, or in response to the removal of power from the managed server system.

Although illustrative embodiments have been shown and described, a wide range of modification, change and substitution is contemplated in the foregoing disclosure and in some instances, some features of the embodiments may be employed without a corresponding use of other features. Accordingly, it is appropriate that the appended claims be construed broadly and in a manner consistent with the scope of the embodiments disclosed herein.

What is claimed is:

1. A key management system, comprising
a remote management system; and
a managed system that is coupled to the remote management system through a network, wherein the managed system includes:
   a managed device that is configured for use in initializing the managed system;
   a managed device locking key storage; and
   at least one local managed device locking subsystem that is coupled to the managed device and the managed device locking key storage, wherein the at least one local managed device locking subsystem includes at least one hardware processor that is configured to:
     retrieve, by a remote access controller provided by the at least one hardware processor in the at least one local managed device locking subsystem and through the network from the remote management system based on the managed device being configured for use in initializing the managed system, a managed device locking key that is configured to unlock the managed device;
     encrypt, by the remote access controller, the managed device locking key to provide an encrypted managed device locking key;
     store, by the remote access controller, the encrypted managed device locking key in the managed device locking key storage;
     retrieve, from the managed device locking key storage in association with an initialization of the managed system, the encrypted managed device locking key;
     decrypt the encrypted managed device locking key to provide a decrypted managed device locking key; and
     unlock, using the decrypted managed device locking key, the managed device for use in initializing the managed system.

2. The system of claim 1, wherein the remote access controller provided by the at least one hardware processor in the at least one local managed device locking subsystem is configured to:
retrieve the encrypted managed device locking key, decrypt the encrypted managed device locking key to provide the decrypted managed device locking key, and unlock the managed device using the decrypted managed device locking key.

3. The system of claim 1, wherein the at least one local managed device locking subsystem includes:
a Basic Input Output System (BIOS) that is provided by the at least one hardware processor and that is configured to:
   retrieve the encrypted managed device locking key, decrypt the encrypted managed device locking key to provide the decrypted managed device locking key, and unlock the managed device using the decrypted managed device locking key.

4. The system of claim 1, wherein the managed system includes:
an encryption key module that is configured to provide encryption keys, and wherein the at least one local managed device locking subsystem is coupled to the encryption key module and is configured to:
   retrieve, at a first time, an encryption key from the encryption key module;
   encrypt, using the encryption key, the managed device locking key to provide the encrypted managed device locking key;
   retrieve, at a second time that is subsequent to the first time, the encryption key from the encryption key module; and
   decrypt, using the encryption key, the encrypted managed device locking key to provide the decrypted managed device locking key.

5. The system of claim 1, wherein the at least one local managed device locking subsystem is configured to:
determine whether the encrypted managed device locking key that is stored in the managed device locking key storage satisfies an encrypted managed device locking key storage duration; and
retrieve, from the managed device locking key storage in response to determining that the encrypted managed device locking key that is stored in the managed device locking key storage satisfies the encrypted managed device locking key storage duration, the encrypted managed device locking key.

6. The system of claim 1, wherein the at least one local managed device locking subsystem is configured to:
determine whether the encrypted managed device locking key that is stored in the managed device locking key storage satisfies an encrypted managed device locking key power cycle rule; and
erase, from the managed device locking key storage in response to determining that the encrypted managed device locking key that is stored in the managed device locking key storage does not satisfy the encrypted managed device locking key power cycle rule, the encrypted managed device locking key.

7. An Information Handling System (IHS), comprising:
at least one processing system; and
at least one memory system that is coupled to the at least one processing system and that includes instructions that, when executed by the at least one processing system, cause the at least one processing system to provide at least one local managed device locking subsystem that is configured to:
   retrieve, by a remote access controller included in the at least one local managed locking subsystem and through a network from a remote management system based on a managed device being configured for use in initializing a managed system, a managed device locking key that is configured to unlock the managed device;
   encrypt, by the remote access controller, the managed device locking key to provide an encrypted managed device locking key;
   store, by the remote access controller, the encrypted managed device locking key in a managed device locking key storage;

retrieve, from the managed device locking key storage in association with an initialization of the managed system, the encrypted managed device locking key;
decrypt the encrypted managed device locking key to provide a decrypted managed device locking key; and
unlock, using the decrypted managed device locking key, the managed device for use in initializing the managed system.

8. The IHS of claim 7, wherein the at least one local managed device locking subsystem is provided by a first processing system and a first memory system that is coupled to the first processing system and that includes instructions that, when executed by the first processing system, cause the first processing system to provide the remote access controller that is configured to:
retrieve the encrypted managed device locking key, decrypt the encrypted managed device locking key to provide the decrypted managed device locking key, and unlock the managed device using the decrypted managed device locking key.

9. The IHS of claim 7, wherein the at least one local managed device locking subsystem is provided by:
a first processing system and a first memory system that is coupled to the first processing system and that includes instructions that, when executed by the first processing system, cause the first processing system to provide the remote access controller; and
a second processing system and a second memory system that is coupled to the second processing system and that includes instructions that, when executed by the second processing system, cause the second processing system to provide a Basic Input Output System (BIOS) that is configured to:
retrieve the encrypted managed device locking key, decrypt the encrypted managed device locking key to provide the decrypted managed device locking key, and unlock the managed device using the decrypted managed device locking key.

10. The IHS of claim 7, wherein the at least one local managed device locking subsystem is configured to:
retrieve, at a first time, an encryption key from an encryption key module;
encrypt, using the encryption key, the managed device locking key to provide the encrypted managed device locking key;
retrieve, at a second time that is subsequent to the first time, the encryption key from the encryption key module; and
decrypt, using the encryption key, the encrypted managed device locking key to provide the decrypted managed device locking key.

11. The IHS of claim 7, wherein the at least one local managed device locking subsystem is configured to:
determine, at a first time, whether the encrypted managed device locking key that is stored in the managed device locking key storage satisfies an encrypted managed device locking key storage duration; and
retrieve, from the managed device locking key storage in response to determining that the encrypted managed device locking key that is stored in the managed device locking key storage satisfies the encrypted managed device locking key storage duration, the encrypted managed device locking key.

12. The IHS of claim 11, wherein the at least one local managed device locking subsystem is configured to:
determine, at a second time that is subsequent to the first time, whether the encrypted managed device locking key that is stored in the managed device locking key storage satisfies the encrypted managed device locking key storage duration; and
erase, from the managed device locking key storage in response to determining that the encrypted managed device locking key that is stored in the managed device locking key storage does not satisfy the encrypted managed device locking key storage duration, the encrypted managed device locking key.

13. The IHS of claim 7, wherein the at least one local managed device locking subsystem is configured to:
determine whether the encrypted managed device locking key that is stored in the managed device locking key storage satisfies an encrypted managed device locking key power cycle rule; and
erase, from the managed device locking key storage in response to determining that the encrypted managed device locking key that is stored in the managed device locking key storage does not satisfy the encrypted managed device locking key power cycle rule, the encrypted managed device locking key.

14. A method for managing keys, comprising:
retrieving, by a remote access controller included in at least one local managed device locking subsystem that is included in a managed system and through a network from a remote management system, a managed device locking key that is configured to unlock a managed device that is included in the managed system and that is configured for use in initializing the managed system;
encrypting, by the remote access controller, the managed device locking key to provide an encrypted managed device locking key;
storing, by the remote access controller, the encrypted managed device locking key in a managed device locking key storage that is included in the managed system;
retrieving, by the at least one managed device locking subsystem from the managed device locking key storage in association with an initialization of the managed system, the encrypted managed device locking key;
decrypting, by the at least one managed device locking subsystem, the encrypted managed device locking key to provide a decrypted managed device locking key; and
unlocking, by the at least one managed device locking subsystem using the decrypted managed device locking key, the managed device for use in initializing the managed system.

15. The method of claim 14, wherein the remote access controller performs the retrieving the encrypted managed device locking key, the decrypting the encrypted managed device locking key to provide the decrypted managed device locking key, and the unlocking the managed device using the decrypted managed device locking key.

16. The method of claim 14, wherein the at least one local managed device locking subsystem includes:
a Basic Input Output System (BIOS) that performs the retrieving the encrypted managed device locking key, the decrypting the encrypted managed device locking key to provide the decrypted managed device locking key, and the unlocking the managed device using the decrypted managed device locking key.

17. The method of claim 14, further comprising:
retrieving, by the at least one local managed device subsystem at a first time, an encryption key from the encryption key module;
encrypting, by the at least one local managed device subsystem using the encryption key, the managed device locking key to provide the encrypted managed device locking key;
retrieving, by the at least one local managed device subsystem at a second time that is subsequent to the first time, the encryption key from the encryption key module; and
decrypting, by the at least one local managed device subsystem using the encryption key, the encrypted managed device locking key to provide the decrypted managed device locking key.

18. The method of claim 14, further comprising:
determining, by the at least one local managed device subsystem at a first time, whether the encrypted managed device locking key that is stored in the managed device locking key storage satisfies an encrypted managed device locking key storage duration; and
retrieving, by the at least one local managed device subsystem from the managed device locking key storage in response to determining that the encrypted managed device locking key that is stored in the managed device locking key storage satisfies the encrypted managed device locking key storage duration, the encrypted managed device locking.

19. The method of claim 18, further comprising:
determining, by the at least one local managed device subsystem at a second time that is subsequent to the first time, whether the encrypted managed device locking key that is stored in the managed device locking key storage satisfies the encrypted managed device locking key storage duration; and
erasing, by the at least one local managed device subsystem from the managed device locking key storage in response to determining that the encrypted managed device locking key that is stored in the managed device locking key storage does not satisfy the encrypted managed device locking key storage duration, the encrypted managed device locking key.

20. The method of claim 14, further comprising:
determining, by the at least one local managed device subsystem, whether the encrypted managed device locking key that is stored in the managed device locking key storage satisfies an encrypted managed device locking key power cycle rule; and
erasing, by the at least one local managed device subsystem from the managed device locking key storage in response to determining that the encrypted managed device locking key that is stored in the managed device locking key storage does not satisfy the encrypted managed device locking key power cycle rule, the encrypted managed device locking key.

* * * * *